United States Patent [19]

Swanson

[11] 3,865,205
[45] Feb. 11, 1975

[54] TWO WHEEL TRACTOR
[75] Inventor: Allan R. Swanson, St. Joseph, Mich.
[73] Assignee: Clark Equipment Company, Buchanan, Mich.
[22] Filed: June 29, 1973
[21] Appl. No.: 375,225

Related U.S. Application Data
[63] Continuation of Ser. No. 197,751, Nov. 11, 1971, abandoned.

[52] U.S. Cl. .................... 180/12, 180/52, 180/73 R
[51] Int. Cl. ............................................ B62d 49/00
[58] Field of Search ............ 180/11, 12, 29, 51, 52, 180/54 F, 71, 73 R, 73 TL, 79.2 B

[56] References Cited
UNITED STATES PATENTS
| | | | |
|---|---|---|---|
| 1,855,642 | 4/1932 | Masury | 180/12 |
| 2,322,477 | 6/1943 | Sjoberg | 180/54 F |
| 2,349,196 | 5/1944 | Perkins | 180/12 |
| 2,368,202 | 1/1945 | Clark | 180/12 |
| 3,061,030 | 10/1962 | Shallenberg | 180/12 |
| 3,118,686 | 1/1964 | McAdams | 280/65 |
| 3,175,637 | 3/1965 | Honda | 180/73 TL |
| 3,549,168 | 12/1970 | Swanson | 280/124 |

FOREIGN PATENTS OR APPLICATIONS
| | | | |
|---|---|---|---|
| 144,137 | 11/1951 | Australia | 180/29 |
| 558,765 | 1/1944 | Great Britain | 180/71 |

Primary Examiner—David Schonberg
Assistant Examiner—John A. Pekar
Attorney, Agent, or Firm—Jack E. Toliver

[57] ABSTRACT

A two wheel tractor having the engine located on the rear portion, the transmission on the front portion, and the wheels on an axle which is carried by a subframe pivoted on the bottom of the front portion and extending rearwardly.

8 Claims, 4 Drawing Figures

PATENTED FEB 1 1 1975 3,865,205

INVENTOR
ALLAN R. SWANSON

BY
*Kenneth C. Witt*

ATTORNEY

TWO WHEEL TRACTOR

This is a continuation of application Ser. No. 197,751, filed Nov. 11, 1971, now abandoned.

BACKGROUND OF THE INVENTION

1. Field of the Invention

This invention relates to two wheel tractors of the type utilized with a trailer portion to form a four wheel articulated vehicle. The trailer portion commonly comprises an earth moving scraper, a wagon, a tank for liquid, or other load handling vehicle portion.

2. Description of the Prior Art

In two wheel tractors of the type mentioned, it is normal to locate the engine in the front portion of the tractor, but with many engines, and particularly with diesel engines which are relatively heavy, such an arrangement tends to create problems of weight distribution when the two wheel tractor is coupled to a trailer portion to form a complete four wheel articulated vehicle. Because of the weight of an engine on the front portion of the tractor in an overhanging position, it is customary to locate the axis of the king pin mechanism which couples the tractor to the trailer portion of the vehicle to the rear of the axis of the axle of the two wheel tractor to improve weight distribution.

A forwardly located engine on the tractor also has other disadvantages, one of which is that it reduces the operator's visibility in many cases because the size of the engine requires that the operator be located at one side of the engine.

The operator being located in close proximity to the engine in such a manner also produces a problem with noise from the engine, and it is frequently a problem to keep the engine noise down to a level which is acceptable to the operator.

Similarly, with the operator located in close proximity to the engine, heat is a problem and it may be necessary to provide considerable insulation between the engine and the operator.

The present invention reduces the problems arising from locating the engine on the front portion of the tractor and at the same time provides more space for the operator because it is possible to make the operator's cab wider and, furthermore, to locate it at any position across the width of the tractor inasmuch as there is no engine there to interfere.

The present invention also promotes safety because it makes it possible to provide for the operator readily to leave the cab or other operator's station from either side, whereas with a conventional two wheel tractor, the engine frequently blocks exit from one side of the cab.

SUMMARY OF THE INVENTION

In carrying out my invention in one preferred mode, I provide a two wheel tractor which has the engine located on the rear portion of the tractor to the rear of the axle. A transmission, if used, may be located on the front portion of the vehicle. Preferably, the axle which carries the two wheels is mounted on a subframe below the main frame of the vehicle which subframe is pivoted on the bottom of the front portion of the tractor. The drive line from the engine through the transmission to the axle to turn the wheels includes a universal joint which is located on the transverse axis on which the subframe is pivoted.

DESCRIPTION OF THE PREFERRED EMBODIMENT

Figure 1:
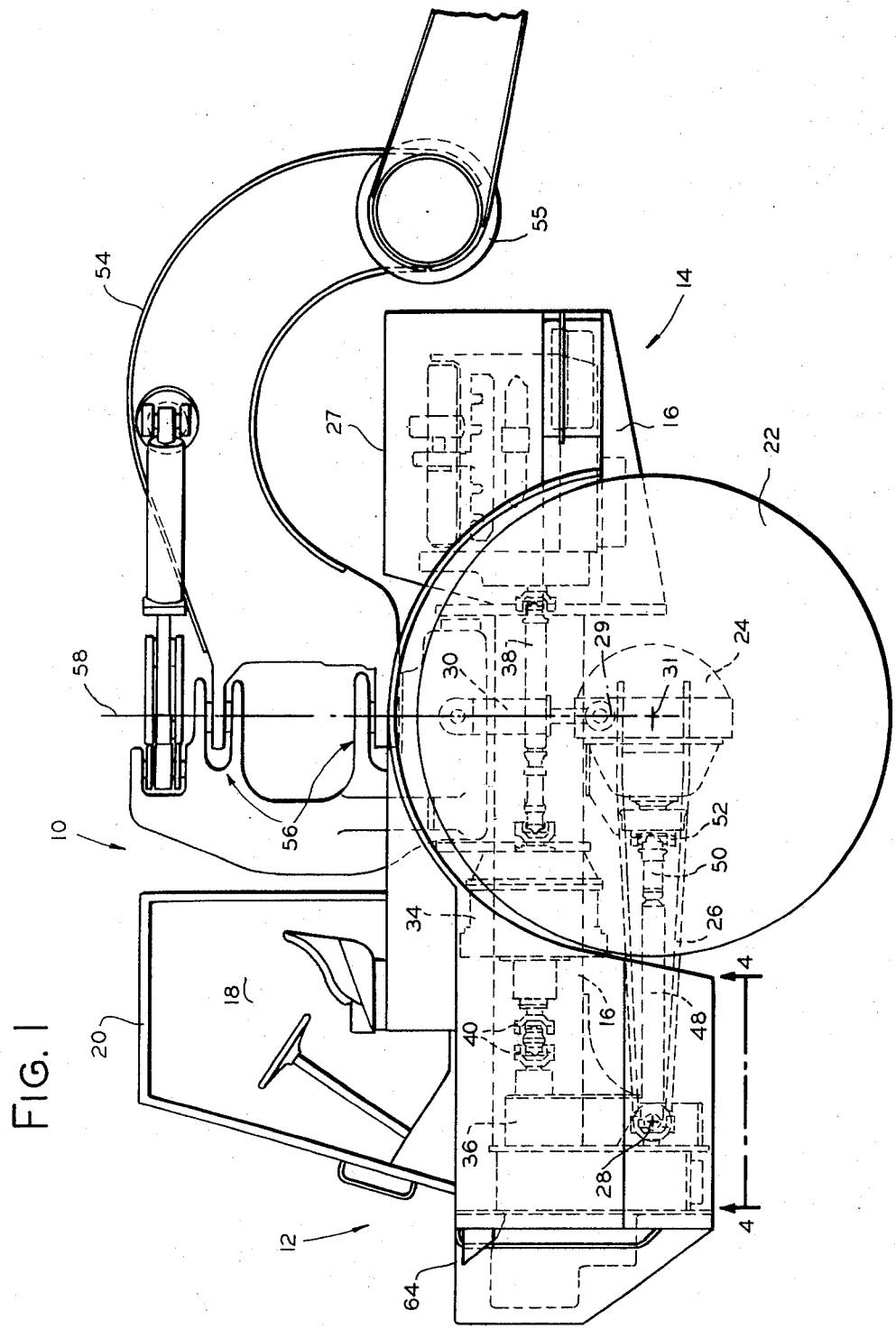
FIG. 1 shows a side elevation schematic view of a two wheel tractor embodying the present invention.
Figure 2:
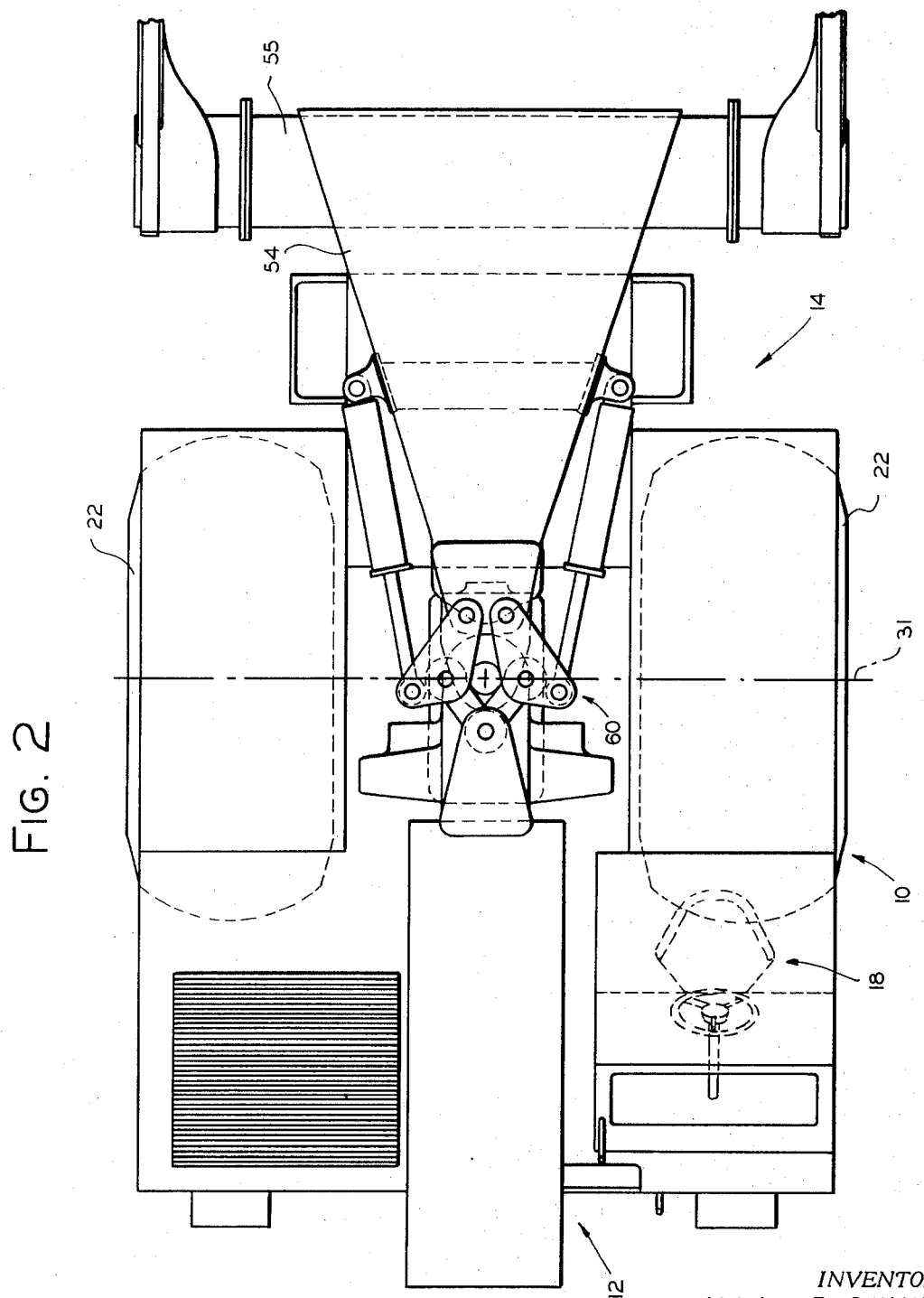
FIG. 2 shows a top plan schematic view of the same vehicle.
Figure 3:
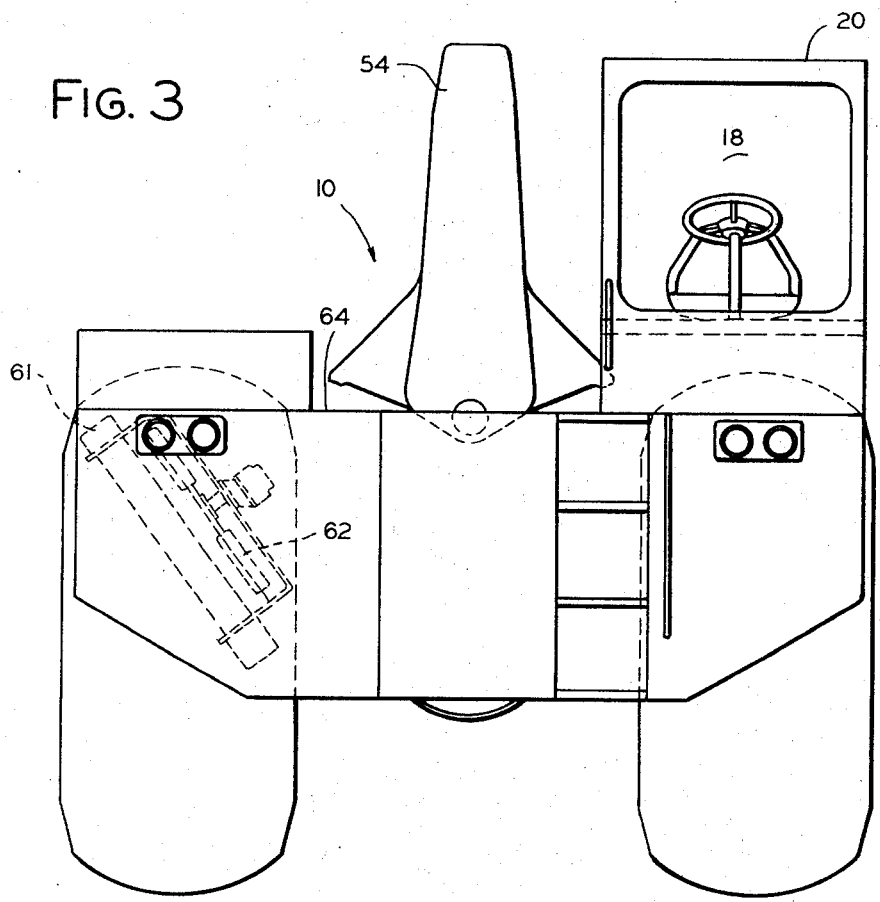
FIG. 3 shows a front elevational schematic view of the same vehicle.

Referring to FIGS. 1, 2 and 3 of the drawing, there is shown a two wheel tractor embodying the present invention which is indicated generally by the numeral 10. The two wheel tractor includes a front portion indicated generally by the numeral 12 and a rear portion indicated generally by the numeral 14. The tractor also includes a structural frame extending from front to rear and supporting the various parts of the tractor to be described hereinafter, and such frame is indicated by the numeral 16. The tractor also includes an operator's station at 18 and such station is enclosed in a cab 20.

For supporting the frame 16 and other parts of the tractor on the wheels 22, a transverse drive axle of a known type, indicated at 24, is provided. The axle 24 is rigidly connected to a subframe 26 which extends rearwardly from a pivot axis 28 where the subframe pivots on the main frame 16. To provide springing and shock absorbing action for the axle 24 a pair of liquid springs 30, only one of which is visible, are provided and these may be connected to an accumulator in a known manner.

In connection with the use of a subframe of this type and liquid springs connected to an accumulator, reference is made to U.S. Pat. No. 3,118,686 McAdams, dated Jan. 21, 1964, which is assigned to the same assignee as the present invention. The said patent explains in detail the bounce retarding action of a liquid spring suspension of the type illustrated in the present vehicle.

In the present vehicle, the engine indicated at 27, which may be a diesel engine, gasoline engine, gas turbine or other equivalent prime mover is mounted on the rear portion of frame 16 behind a vertical plane 29 which is indicated in FIG. 1 as extending upwardly through the axis 31 of the axle and the wheels 22.

Mounted forwardly of plane 29 in the tractor illustrated is a hydraulic torque converter indicated at 34 and a transmission indicated at 36. The engine is coupled by means of a suitable drive shaft 38 and universal joints to the torque converter, and the torque converter in turn is connected through a double universal joint 40 to the transmission to form a part of the drive line between the engine and the wheels.

Figure 4:
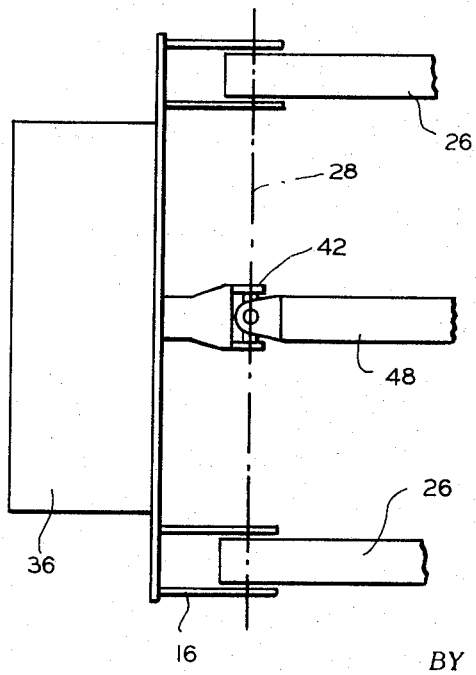
FIG. 4 shows a fragmentary view along the line 4—4 of FIG. 1.

The output shaft of the transmission is connected as shown in FIG. 4 to a universal joint 42 which is located on the transverse axis 28 about which the subframe 26 pivots on the main frame 16, as seen best in FIG. 4. The drive line is completed by drive shaft 48 which is connected between universal joint 42 and the axle 24 through a slip joint 50 and another universal joint 52.

The two wheel tractor 10 described and illustrated herein is coupled to a trailer portion to form a complete vehicle, and FIGS. 1 and 2 of the drawing show a part of such trailer portion including a gooseneck 54 and a yoke 55. A suitable king pin portion indicated generally at 56 is utilized to provide a combined steering and draft coupling between the tractor portion and the trailer portion of the vehicle. In the construction illustrated, there are two separate pivot points involving two pivot pins instead of a single king pin, but such a coupling mechanism is still commonly referred to as a king pin mechanism. The pivot axis of the king pin mechanism is indicated at 58 and in the at-rest position illustrated in FIG. 1 of the drawing, axis 58 coincides with vertical plane 29 through the horizontal axis 31 of the axle. It will be appreciated, however, that as axle 24 and the wheels thereon move up and down about pivot axis 28 of the subframe that plane 29 and vertical pivot axis 58 do not coincide at all times during operation of the vehicle.

FIG. 2 shows some details of the linkage mechanism for steering the vehicle of which the present two wheel tractor is a part and this mechanism is indicated generally at 60. No further details are given of this mechanism in the present description, but if further details are needed, a similar mechanism is described and claimed in U.S. Pat. No. 3,032,135 McAdams which likewise is assigned to the same assignee as the present invention.

The optimum location of the king pin pivot axis depends upon many factors, but the present arrangement with the engine 26 on the rear portion of the two wheel tractor, in many instances, particularly when a heavy diesel engine is used, makes it possible to locate the pivot axis 58 as shown to intersect approximately the axis 31 of the axle. If a heavy engine such as diesel engine 26 is located on the forward portion of the tractor, it frequently is necessary to move the pivot axis 58 of the king pin mechanism to the rear in order to provide proper weight distribution and stability for the complete articulated vehicle.

FIG. 3 of the drawing shows one suitable location for the radiator for cooling the engine 26, such radiator being indicated at 61 and the fan for same at 62. In such location the heated air can be directed away from the operator and also the fan is remote from dirt and dust which may be present on the rear part of the vehicle if it is a scraper, for example, which is loading and unloading earth.

The location of the universal joint 42 on the pivot axis of the subframe minimizes the angularity through which the universal joint 42 must act as compared with the arrangement shown in U.S. Pat. No. 3,118,686, for example, in which the engine is in the front of the vehicle, the transmission in the rear, and the transmission is connected to the axle through universal joints which must provide for considerably greater angularity of movement. It will be appreciated that the smaller the angle through which the universal joint has to operate, the greater will be the life of such a joint or the longer it will operate before repairs or adjustment is required.

Referring to FIGS. 1 and 3 of the drawing, it will be observed that there is a flat horizontal deck 64 on the front portion of the tractor above the main frame 16 and above the transmission 36. As shown, the operator's station 18 is mounted at the left side of this deck, looking in the direction that the operator of the vehicle looks when he is driving the machine forwardly, but it will be appreciated that the operator's station can be moved to the center or to the other side of the said deck 64 if desired.

While I have described and illustrated herein a preferred mode for carrying out my invention, it will be appreciated that modifications may be made by those skilled in the art. Accordingly, it should be understood that I intend to cover by the following claims all such modifications which fall within the true spirit and scope of my invention.

I claim:

1. A two-wheeled tractor having a main frame, a drive axle extending transversely of the main frame, a subframe having a pair of suspension arms pivotally connected to the main frame and extending longitudinally beneath the main frame, said drive axle being rigidly supported on the ends of said arms, a pair of suspension cylinders mounted between the subframe and main frame above the centerline of the drive axle retarding oscillatory movement of the axle, an engine mounted on the main frame, a drive line extending from the engine, a transmission having an input shaft connected to the driveline and an output shaft below the main frame, a universal coupling on the output shaft, a second driveline connected to the universal coupling and extending in substantial horizontal alignment with the subframe and connected to the drive axle, the pivot axis of the arms of the subframe coinciding with the transverse axis of the universal coupling about which the drive axle oscillates.

2. A two-wheeled tractor according to claim 1 wherein the engine is mounted behind the axle and the transmission forward thereof.

3. A two-wheeled tractor according to claim 1 wherein a kingpin provides a draft coupling for a trailer portion, the axis of said king pin being in a substantially vertical plane containing the transverse axis of the drive axle.

4. A two-wheeled tractor according to claim 1 wherein the suspension cylinders are mounted in a substantially vertical plane containing the transverse axis of the drive axle and extend above the main frame.

5. A two-wheeled tractor having a main frame, a drive axle extending transversely of the main frame, a subframe having a pair of suspension arms pivotally connected to the main frame adjacent the forward end thereof and extending rearwardly longitudinally beneath the main frame, said drive axle being rigidly supported at the trailing ends of said arms, a pair of suspension cylinders, one on each side, mounted substantially vertically above each arm and extending upwardly therefrom connecting at their upper ends to the main frame acting to retard the oscillatory movements of the drive axle, an engine mounted behind the drive axle on the main frame, a forwardly extending drive line connected to the engine, a transmission mounted on the main frame in front of the drive axle having a rearwardly projecting input shaft connected to said forwardly extending drive line and a rearwardly projecting output shaft below the main frame on a line substantially horizontal with said subframe, a universal coupling on said output shaft, a second drive line connected to the universal coupling and extending rearwardly in substantial horizontal alignment with the subframe and connected at the rear end to said drive axle, the pivot axis of the arms of the subframe coinciding with the transverse axis of the universal coupling about which the drive axle oscillates.

6. A two-wheeled tractor according to claim 5 wherein there is a king pin which provides a draft coupling with the tractor for a trailer portion, the axis of said king pin being in a substantially vertical plane containing the transverse axis of the drive axle.

7. A two-wheeled tractor according to claim 6 wherein the suspension cylinders are also mounted in said substantially vertical plane containing said king pin axis and transverse axis of the drive axle.

8. A two-wheeled tractor according to claim 7 wherein said suspension cylinders are pivotally mounted at the lower ends to said subframe below the main frame and extend upwardly pivotally mounting at their upper ends above the main frame of the tractor.

* * * * *